United States Patent
Käppi et al.

(10) Patent No.: US 10,427,582 B2
(45) Date of Patent: Oct. 1, 2019

(54) LOAD CONTROL DEVICE AND METHOD

(71) Applicant: Deere & Company, Moline, IL (US)

(72) Inventors: Timo Käppi, Nokia (FI); Marko Paakkunainen, Tampere (FI)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/830,440

(22) Filed: Dec. 4, 2017

(65) Prior Publication Data

US 2018/0194266 A1 Jul. 12, 2018

(30) Foreign Application Priority Data

Jan. 11, 2017 (EP) .................................... 17151022

(51) Int. Cl.
  *B60P 3/41* (2006.01)
  *A01G 23/00* (2006.01)
  *G06K 9/00* (2006.01)
  *B62D 33/02* (2006.01)

(52) U.S. Cl.
  CPC ............... *B60P 3/41* (2013.01); *A01G 23/00* (2013.01); *B62D 33/02* (2013.01); *G06K 9/00671* (2013.01)

(58) Field of Classification Search
  USPC ........................................................ 701/50
  See application file for complete search history.

(56) References Cited

U.S. PATENT DOCUMENTS

| | | | | |
|---|---|---|---|---|
| 3,455,352 A | * | 7/1969 | Finneman | B27B 5/10 144/335 |
| 3,591,025 A | * | 7/1971 | Perrott | B60P 1/483 414/709 |
| 4,913,551 A | * | 4/1990 | Davis | G01B 11/00 356/2 |
| 4,984,961 A | * | 1/1991 | Herolf | A01G 23/006 144/256.1 |
| 7,228,881 B1 | * | 6/2007 | Smith | B27B 17/0091 144/193.1 |
| 2006/0092403 A1 | * | 5/2006 | Dralle | A01G 23/00 356/71 |
| 2008/0208361 A1 | * | 8/2008 | Grgic | G05B 19/41865 700/2 |
| 2013/0233448 A1 | * | 9/2013 | Schrubbe | A01G 23/097 144/343 |
| 2014/0088822 A1 | * | 3/2014 | Jensen | G01N 9/36 701/34.4 |

(Continued)

FOREIGN PATENT DOCUMENTS

| | | |
|---|---|---|
| DE | 102009027449 A1 | 1/2011 |
| EP | 1532421 A1 | 5/2005 |

(Continued)

OTHER PUBLICATIONS

European Search Report issued in counterpart application No. 17151022.5 dated Jul. 13, 2017 (6 pages).

*Primary Examiner* — Tyler D Paige

(57) ABSTRACT

A load control device includes a camera to capture information of objects of load handled by a load handling device to forward such information to a computer, which compares load data derived therefrom with reference data in a data source and emits a signal to an output device in the case of a certain conflict between the data.

13 Claims, 1 Drawing Sheet

(56) References Cited

U.S. PATENT DOCUMENTS

| | | | |
|---|---|---|---|
| 2014/0271079 A1* | 9/2014 | Fichtinger | B66C 23/46 414/729 |
| 2015/0289449 A1* | 10/2015 | Greer | A01D 90/083 414/24.5 |
| 2016/0031688 A1* | 2/2016 | Versteyhe | B66C 13/46 701/50 |
| 2016/0116328 A1* | 4/2016 | Kivi | B66C 13/16 702/101 |
| 2017/0137072 A1* | 5/2017 | Hendricks | B62D 33/06 |
| 2018/0194266 A1* | 7/2018 | Kappi | A01G 23/00 |

FOREIGN PATENT DOCUMENTS

| | | | |
|---|---|---|---|
| EP | 2455708 A1 | 5/2012 | |
| WO | 03059689 A1 | 7/2003 | |

\* cited by examiner

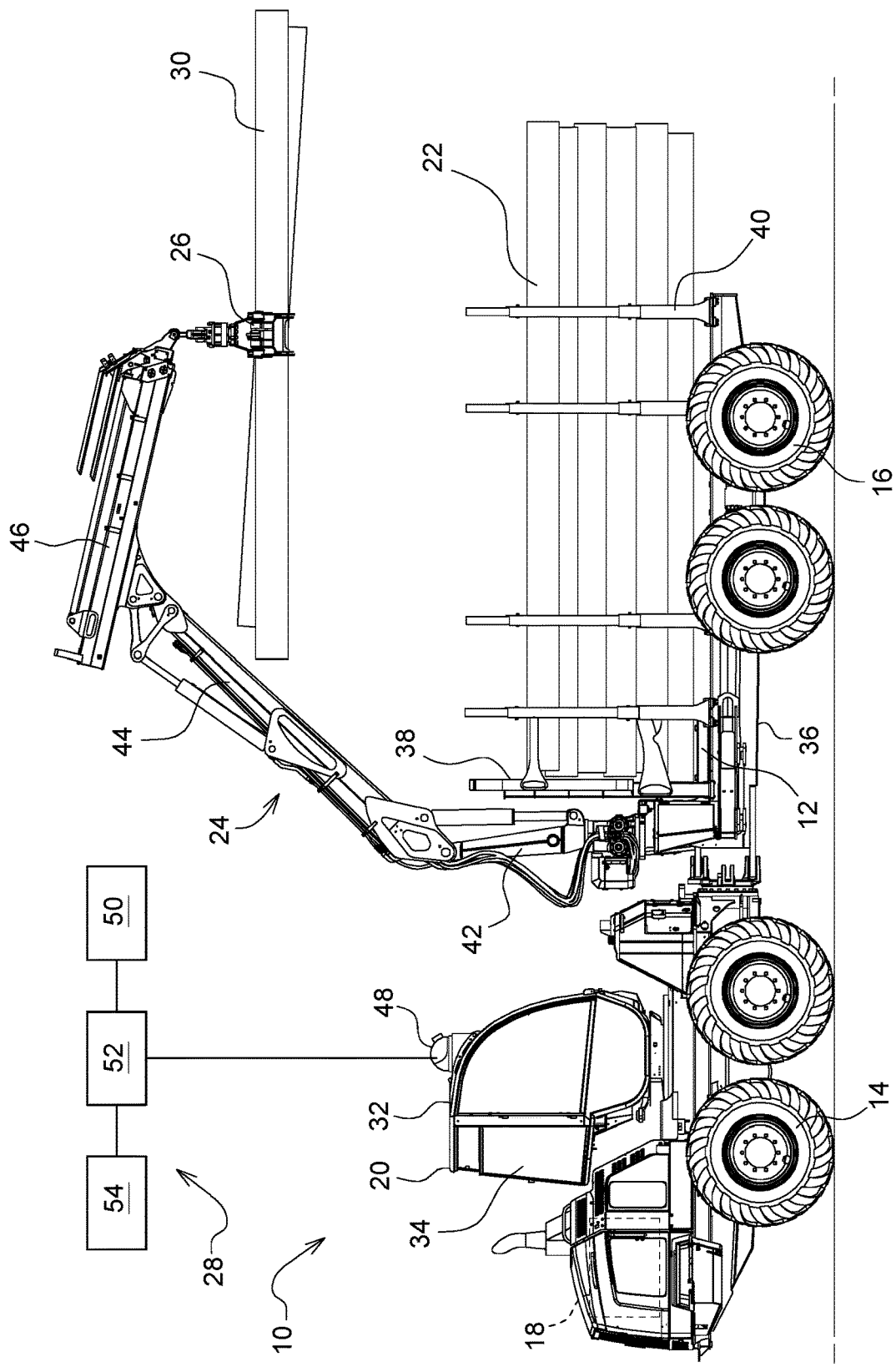

LOAD CONTROL DEVICE AND METHOD

RELATED APPLICATIONS

This application claims priority to European Patent Application Ser. No. 17151022.5, filed Jan. 11, 2017, the disclosure of which is hereby expressly incorporated by reference in its entirety.

FIELD OF THE DISCLOSURE

The present disclosure relates to a load control device and a method for generating a signal based on data captured by at least one camera from objects of load.

BACKGROUND

It is known in the art, such as from EP152421 and EP2455708, to compute a number and a mass of logs by using a camera. There is a need, however, for better use of the date captured by the camera.

SUMMARY

In one embodiment of the present disclosure, data obtained from the handled objects of load may be used to alert an operator in a certain instance, which alert causes the load control device to react in a predefined way. Objects of load may include harvested trees, logs, but also tubes, bags, etc. The load handling device in a simple version may be a grapple with or without a saw, but it may also be a tree harvesting head. Reference data may be provided in a memory in the form of a permanent database, or of a short term memory, which receives data for doing a certain job and deleting these data afterwards or even online, i.e., in any kind of data source. The computer may be a simple controller, as well as a highly sophisticated CPU on a vehicle, on the load handling device, remote from either of them, or potentially even in the cloud.

The load control device itself is seen as the totality of components needed to perform the method as described below, which components may change depending on the design of the individual components. "Conflict" does not necessarily mean a problem between data, but stands for a difference between data, which difference calls for an alert. The camera may be of any useful kind with one or more lenses, which with the computer can measure the diameter, the edge lengths, the longitudinal length, etc. of an object of load, like the dimensions of a log.

The camera may be provided at different locations, like on a boom, a cab, a chassis or a structure of a machine handling the objects of load. The machine may be a vehicle in general, like a forestry machine, in particular a forwarder, a construction machine, a crane or the like; but it may also be a stationary machine like a knuckleboom loader or any other kind of crane or loader. The camera may be attached such that it has a good view to the object of load to either measure dimensions or properties, like color, texture, shape, or indicators. It may be possible to use different cameras for different measurements, like one for the diameter on a cab and one for the length on a boom. If the camera is used to generate data about the filling grade or distribution of logs in a load space, the camera may be best positioned on a chassis or structure in general. The location of the cameras may be chosen at any desirable location known to one skilled in the art depending on the kind of the camera and its application.

While a fixed camera may be sufficient in a case, where the objects of load are easy to see and measure under all or most circumstances, a movable camera may orient itself or may get oriented by an operator such, that it gets the best view of the object of load.

Reference data means data such as a target, threshold, or the like and may comprise data received from a first handling device, in particular from a forest harvester. The data may be the number, the size, location, kind, etc. of logs derived from felled trees stored in the forest. Such data may be entered into a memory wireless and online or by a memory stick, etc., but it may also be received online from a remote data source. The load data are those generated from the objects of load handled with the load handling device, which again may be the number, size, location, kind of logs, etc. These data may deviate from each other, e.g., a forest harvester may have dropped 50 logs on a given spot, but a forwarder only found 40 of the 50 logs. If an acceptable deviation is 10%, the load control device may generate a signal for an alert when the load data does not reach 45 logs.

Another kind of reference data may include data about a maximum load or load distribution of objects of load in a load space, in particular of a forwarder, whereas a signal is generated when the load data and the reference data deviate more than a predefined amount. In this case, the load control device may alert the operator via any useful kind of output device, that instead of 100 permissible logs, 110 logs have been loaded, which is not allowed, when the maximum deviation may be 5%. It may also be recognized, when too many logs are loaded on one side compared to another, or that in some places two logs have been placed behind each other and in other places not, etc.

In addition to alerting an operator or a device about a mismatch between reference and load data, properties of the load, in particular specific density, origin, etc. may be computed by using data from a memory used or another memory or online and provided to the operator or a database of the machine or forest owner.

Beyond or instead of capturing dimensions of the load, like diameter, length, etc., it may also be appropriate and sufficient using a camera, which only detects an indicator on the object of load, like a color marking at the cut surface of the log. By recognizing respective color dots it is possible to count the logs as well as to identify their kind, origin, etc. In the case of objects of load other than logs, but huge bags, for example, the indicator may also be a bar code indicating something about the content of the bags. If tubes are the objects of load, the indicator may stand for certain properties, like maximum allowable pressure, material, length, diameter, etc. Depending on the findings, the load control device may give an alert, when the reference data expect a certain amount, kind, etc. of objects, whereas the handled load does not meet these expectations.

A method of generating a signal indicative of a conflict between load data and reference data by means of a load control device functions in a way analogous to the load control device described above. The method may be executed by a soft or hardwired computer.

The calculation of the mass or number or the variations of handled objects of load, in particular of logs, gives an operator even more information beyond the alerting function.

The information obtained by this method can be forwarded to a subsequent truck, a saw mill, a pipe layer, a construction firm, etc., for scheduling subsequent operations.

While the alert can be given in any useful way, emitting a signal by the computer to an output device like a monitor, a buzzer, a strobe light, a warning light, or to any other sensory alarm assures that the difference between reference data and load data is understood to exist and maybe even to be critical. Such critical situation may be an overload.

An even higher effect beyond an alert is achieved when the signal emitted by the computer is provided to a control for a crane, disabling further handling objects of load once a threshold value of divergences between load data and reference data is exceeded.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein:

The FIGURE is a side view and schematic of a work machine having a load control device.

DETAILED DESCRIPTION

In the FIGURE, a machine 10 has a structure 12, front ground engaging means 14, rear ground engaging means 16, an engine 18, a cab 20, a load space 22, a boom 24, a load handling device 26 and a load control device 28.

The machine 10 is shown in the form of a forwarder transporting logs in a forest. Forest harvesters, trucks with loading devices, knuckle-boom loaders, etc., may be other types of machines 10. In the case of a forwarder, the machine 10 may pick up objects of load 30, such as in the form of logs deposited on the ground by a forest harvester, thereby capturing data of the objects of load 30 and transporting them to another place, like a road side. While a forwarder is a vehicle, the machine 10 may also be stationary like a crane.

The structure 12 in this case is formed as an articulated frame, the front part of which carries the engine 18 and the cab 20 and is supported on the ground by the front ground engaging means 16, and the rear part of which carries the load space 22 and the boom 24 and is supported on the ground by the rear ground engaging means 16.

The front and rear ground engaging means 14, 16 may be single or tandem axles with wheels or tracks, single suspended wheels, etc.

The engine 18 provides all the power for the machine 10, be it to move it over the ground, operate the boom 24 and the load handling device 26 or to provide the electric energy for the load control device 28, etc.

The cab 20 in this application is attached to the structure 12 such that it can pivot about a vertical or substantially vertical axis in order to follow the movement of the boom 24. In other applications, only part of the cab 20, like a seat, may pivot. But the cab 20 may also be stationary on the structure 12. The cab 20 is provided in a usual way with a frame 32 and windows 34 between. The location of the cab 20 is such that it always has a good view onto the objects of load 30 in the load handling device 26 and to the load space 22.

The load space 22 is formed as a huge cage with a bottom 36, a head board 38 at the front and bunks 40 at the side. This load space 22 can be filled by objects of load 30, like logs, oriented along the longitudinal axis of the load space 22, which in a straight forward drive direction is also the longitudinal direction of the machine 10. While it is not shown, it is known to subdivide the load space 22 into sub-spaces for different species, diameters, quality, etc. Objects of load 30 may extend over the entire length of the load space 22 or only over a part of it and, depending on their length, more than one may be deposited in the load space 22 in the longitudinal direction. The head board 38 as well as the bunks 40 have a certain height above which no objects of load 30 should be located, because this may result in objects of load 30 falling off the load space 22 during transport and creating damages or injuries. Furthermore, the load space 22 and the structure 12 have a certain strength, which should not be exceeded by loading too many objects of load 30.

The boom 24 is of a well-known three-part design with a post 42, a jib boom 44 and an extension 46, linked to another in joints and movable with respect to each other by means of actuators. The boom 24, in particular its post 42, may pivot about a vertical or substantially vertical axis on the structure 12, such that its jib boom 44 and its extension 46 move above the load space 22, which is possible due to the post 42 being higher than the head board 38.

The load handling device 26 is in the form of a grapple rotating about a vertical axis at the free end region of the extension 46. The load handling device 26 is able to grab one or more objects of load 30, depending on their cross section, whereas the objects of load 30 generally are held in their lengthwise center area. The load handling device 26 can be rotated about its vertical axis by means of a so-called power actuated rotator.

The load control device 28 is an assembly of components including a camera 48, an output device 50, a computer 52 and a data source 54, which components may be combined in a single unit or distributed all over the machine 10. The load control device 28 is designed to receive and calculate data from the handled objects of load 30, compare them against data in the data source 54 and send a signal to the output device 50.

The objects of load 30 may be logs, i.e., pieces cut from a harvested tree, of a certain species, length, diameter, density, quality, etc. Other objects of load may be pipes for pipelines, bags, etc., each with their own characteristics. In some cases, objects of load have a color marking on their face side which may stand for the place where the objects of load 30 come from, what criteria they meet, etc., as this is known in the art.

The camera 48 may have one or more lenses or may even exist several times, i.e., more than one camera is used. The camera 48 may be provided at any place where it can be directed to the objects of load 30, i.e., its face side to recognize the cross section and to the long side such that it can recognize the length of the object of load 30. It is possible that the face side and the long side are recognized by different lenses or different cameras 48. The camera 48 may be connected wirelessly or by a wire to the computer 52. The camera 48 in this application is connected to the upper region of the cab 20, internally or externally, as the cab 20 in this case rotates with the boom 24 with or without delay. In a case, in which the cab 20 is stationary on the structure 12, but a seat inside the cab 20 rotates, the camera 48 may be connected to the seat or even on the helmet of an operator. Finally, the camera may be attached to boom 24, like to the underside of the jib boom 44.

The output device 50 in this case is formed as a monitor with a display, but it can also be provided with an audible alarm. The output device 50 is likewise connected to the computer 52 and is located in the cab 20 close to a seat for the operator. However, the output device 50 may also be arranged in a control center remote from the machine 10, where several machines 10 are monitored.

The computer 52 may be an onboard central procession unit arranged somewhere on the structure 12 or at the cab 20. The computer 52 is powered by an engine driven generator. It has programs installed or connected with, which are able to receive the data captured by the camera(s) 48 and calculate therefrom the size or volume of the objects of load 30 handled by the load handling device 26. The computer 52 may or may not be connect through radar to other computers on other machines, in a control center, etc.

The data source 54 may be provided in the computer 52 or is connected to the computer 52 and has reference data, like the maximum allowed weight, height or number of objects of load 30 in the load space 22. Other reference data may be the number or characteristics of objects of load 30 to be found in a defined area. If the data source 54 is not implemented in the computer 52 it is connected through wire or wireless to it.

Based on the above described structural composition the load control device functions as follows. Once all relevant components are powered, the boom 24 moves the load handling device 26 to objects of load 30 resting on the ground or elsewhere, in order to grab and move them to the load space 22. On the way to the load space 22, the camera 48 captures the cross section of the object or of several objects of load 30 in the load handling device 26, which is possible in particular as the objects of load 30 rotate with the load handling device 26 about the vertical axis described above in the end region of the extension 46 or boom 24. This rotation allows a look to the long side of the objects of load 30 to measure the length. In highly sophisticated machines 10 the rotation angle of the load handling device 30 and thus the orientation of the objects of load 30 with respect to the boom 24 and thus also to the camera on the boom 24 or in the cab 20 is known, which value can be considered by the computer 52 when calculating the size and volume of the objects of load 30.

In one embodiment, the objects of load 30 may include a color indicator or other kind of indicator and the camera 48 may detect this and potentially also differentiate between different indicators, like colors, having different meanings. Once the size, volume, indicator, etc., are calculated by the computer 52, these data are compared with the data in the data source 54. If this reference shows a gap of a predefined size, a signal is generated by the computer 52 and sent to the output device 50. For example, the load control device 28 may have calculated as load data that the objects of load 30 put into the load space 22 have a total weight of 16 tons, whereas the reference data for this load space are 15 tons, the output device 50 may show a hint or emit a noise, that further loading is not allowed. It may even block the operation of the load handling device 26. Alternatively, the load control device 28 via the camera may have recognized as load data 120 logs handled by the load handling device 26, but the reference data show that in this location 130 logs should be located, the same hint or noise may be generated by the output device 50 and potentially the machine 10 is even blocked from driving away.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A load control device, comprising:
   a load handling device for picking and releasing objects of load;
   at least one camera configured to recognize one or more objects of load in the load handling device;
   a computer for generating load data based on the visual information obtained from the at least one camera; and
   reference data stored or accessed by the computer;
   wherein, the computer is designed to generate a signal indicative of a conflict between the load data and the reference data.

2. The load control device of claim 1, wherein the at least one camera is located on a boom, a cab or a structure of a work machine.

3. The load control device of claim 1, wherein the at least one camera is fastened in a fixed or a movably manner.

4. The load control device of claim 1, wherein the reference data comprises data received from a first handling device, and a signal is generated when the load data and the reference data deviate more than a predefined amount related to a threshold.

5. The load control device of claim 1, wherein the reference data comprises data about a maximum load or load distribution of a load space, and a signal is generated when the load data and the reference data deviate more than a predefined amount.

6. The load control device of claim 1, wherein additional data is provided about properties of the objects of load including specific density or origin from a data source online or in a memory or database.

7. The load control device of claim 1, wherein the camera is configured to provide data about the individual or total dimensions of the objects of load or of the presence of an indicator on the objects of load.

8. The load control device of claim 1, wherein the output device comprises a monitor, a buzzer, a strobe light, a warning light, or a sensory alarm.

9. A method of generating a signal indicative of a conflict between load data and reference data by means of a load control device, comprising:
   collecting or releasing one or more objects of load by a load handling device of a machine;
   providing at least one camera located on a boom or in a cab of the machine;
   recognizing an attribute of the one or more objects of load by the camera;
   generating a load data by a computer based on visual information obtained from the at least one camera;
   providing reference data to the computer related to the one or more loads;
   comparing by the computer the load data with the reference data; and
   emitting a signal to an output device when the load data differs from the reference data by a predetermined value.

10. The method of claim 9, further comprising calculating a mass, a number, or variations of the one or more objects of load by the computer.

11. The method of claim 9, further comprising preparing and making available data of the one or more objects of load for subsequent processing by the computer.

12. The method of claim 9, wherein the output device comprises a monitor, a buzzer, a strobe light, a warning light, or a sensory alarm.

13. The method of claim 9, further comprising controlling a crane for disabling a further handling of the one or more objects of load based on the emitted signal once a threshold value of divergences between load data and reference data is exceeded.

\* \* \* \* \*